United States Patent

[11] 3,599,852

[72] Inventor Josef Eichenhofer
 120 Oakdale Road, Downview 479,
 Ontario, Canada
[21] Appl. No. 884,653
[22] Filed Dec. 12, 1969
[45] Patented Aug. 17, 1971

[54] AUTOMATIC BAR FEEDER ATTACHMENT FOR MULTIPLE SPINDLE SCREW MACHINES
 6 Claims, 7 Drawing Figs.
[52] U.S. Cl. .................................................. 226/155
[51] Int. Cl. .................................................. B65h 17/22
[50] Field of Search ........................................ 226/124, 154, 155

[56] References Cited
UNITED STATES PATENTS
3,203,608  8/1965  Mogolis .................. 226/124
3,372,449  3/1968  Jamison .................. 226/155 (X)

Primary Examiner—Richard A. Schacher
Assistant Examiner—Gene A. Church
Attorney—Cumpston, Shaw & Stephens ABSTRACT: In a spindle bar machine having a hollow spindle through which a workpiece bar is cyclically advanced, a feeder formed of an elongated housing arranged transversely to the bar and rockingly mounted upon a machine shaft by a journal formed upon one end of the housing, with a motor arranged within the housing, and having a constantly rotating drive shaft extending out of the opposite end of the housing and carrying a roller arranged to periodically peripherally engage and longitudinally thrust the bar for advancing it. The housing is rocked about its journal towards and away from the bar by a housing cam follower engaging a machine rotated cam.

PATENTED AUG 17 1971

INVENTOR
JOSEF EICHENHOFER

BY *Cullen, Settle, Sloman & Cantor*

ATTORNEYS

INVENTOR
JOSEF EICHENHOFER 3,599,852

1

AUTOMATIC BAR FEEDER ATTACHMENT FOR MULTIPLE SPINDLE SCREW MACHINES

BACKGROUND OF INVENTION

In conventional multiple spindle screw or bar machines, a number of bars or rods are supported within spindles which are advanced or indexed from station to station where various cutting and machining operations are applied to the workpiece. After the bar or rod workpiece is indexed through the various work stations, it is advanced through the spindle so that the next increment of the workpiece may be indexed through the work stations.

In the past, manually operable locking and advancing mechanisms were provided. Thereafter, attempts have been made to provide an automatic advancing or feed mechanism for advancing the bar workpiece at the proper time.

An example of such an automatic feed mechanism is illustrated in the U.S. Pat. No. 3,203,608, to Mogolis, granted Aug. 31, 1965. Such feed mechanism is relatively complex and requires some modification of the basic spindle machine.

Hence, attempts have been made to form a feed attachment which can be applied to a spindle machine without modifying the machine at all. An example is shown in the U.S. Pat. No. 3,372,449, to Jamison, granted Mar. 12, 1968. Here, an automatic feed attachment was added to the spindle bar machine which was otherwise unmodified.

The invention herein relates to a further improvement in such an automatic bar feed attachment wherein the feed mechanism is considerably simplified and made more compact and particularly so formed as to absorb considerably greater loads thereby increasing the life of the attachment and reducing maintenance thereon.

SUMMARY OF INVENTION

In summary, the invention herein contemplates forming an automatic feed mechanism comprising a housing within which the drive motor is mounted, with one end of the housing formed as a journal for journal mounting upon a support shaft forming part of the spindle machine, and with the drive roller mounted upon the opposite end of the housing and driven constantly by the motor shaft. The roller is mounted upon an outer shaft which fits over and is secured to the motor shaft and which forms part of a cover or end cap which overlaps the housing and which is supported by bearings thereon, thereby transmitting the transverse forces applied to the roller directly to the housing rather than solely to the motor shaft, thus reducing the strain on the motor and prolonging its life.

The housing is rocked towards and away from the workpiece bar by means of a suitable cam follower engaging a cam mounted upon an operating drum driven by the spindle machine. Thus, by properly timing the cam, the roller contacts and longitudinally thrusts and advances the workpiece at the proper time during the cycle where the workpiece is to be advanced.

The overall construction herein is relatively lightweight, compact and easily mountable and removable from the spindle bar machine so that it may be provided as a separate attachment to existing machines.

These and other objects and advantages of this invention become apparent upon reading the following description, of which the attached drawings form a part.

2

Figure 5:
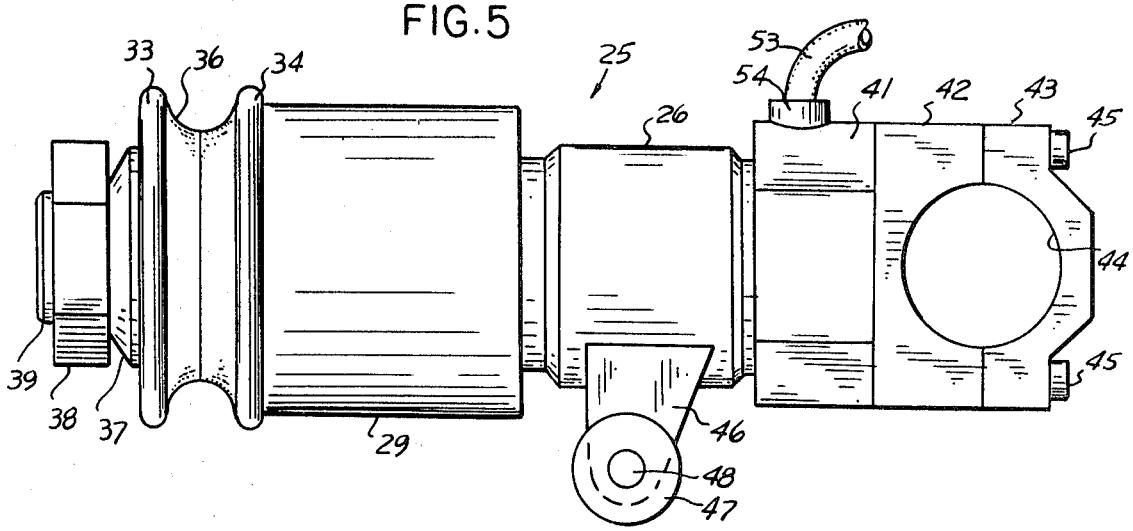

FIG. 5 is an elevational view of the attachment, and

Figure 6:
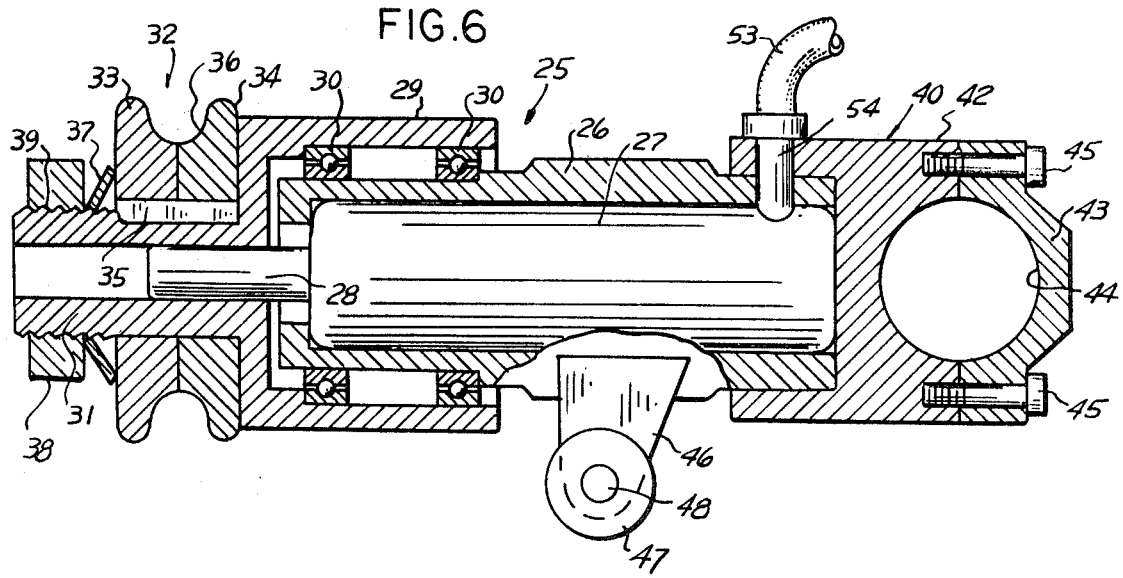

FIG. 6 is a view similar to FIG. 5 but in cross section.

Figure 7:
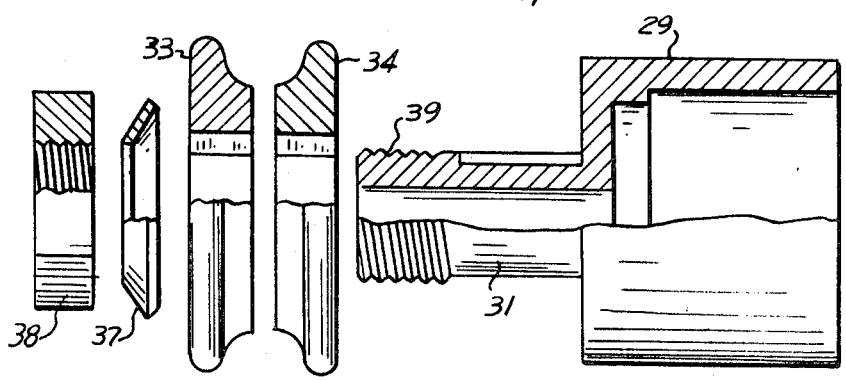

FIG. 7 is an exploded view, partially in cross section, of several of the parts forming the attachment.

DETAILED DESCRIPTION

Figure 1:
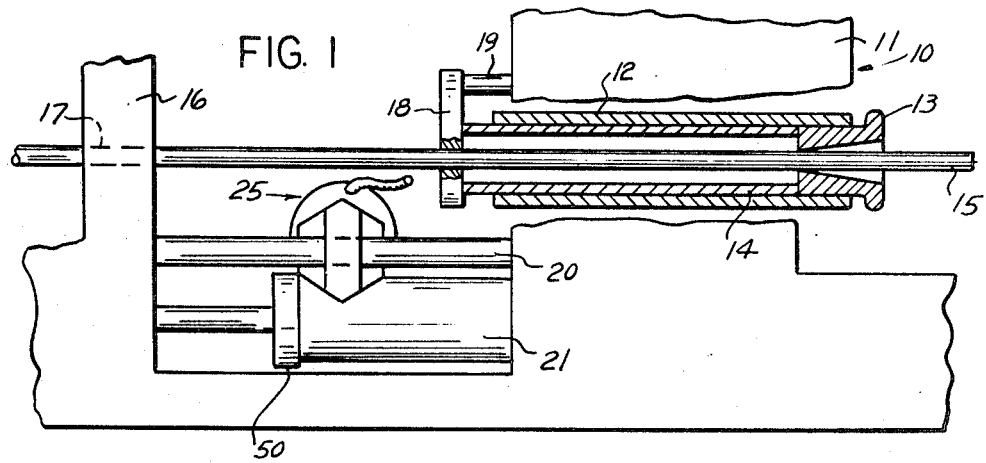
FIG. 1 is a schematic view, partially in cross section, of a portion of a conventional multiple spindle screw or bar machine.
Figure 2:
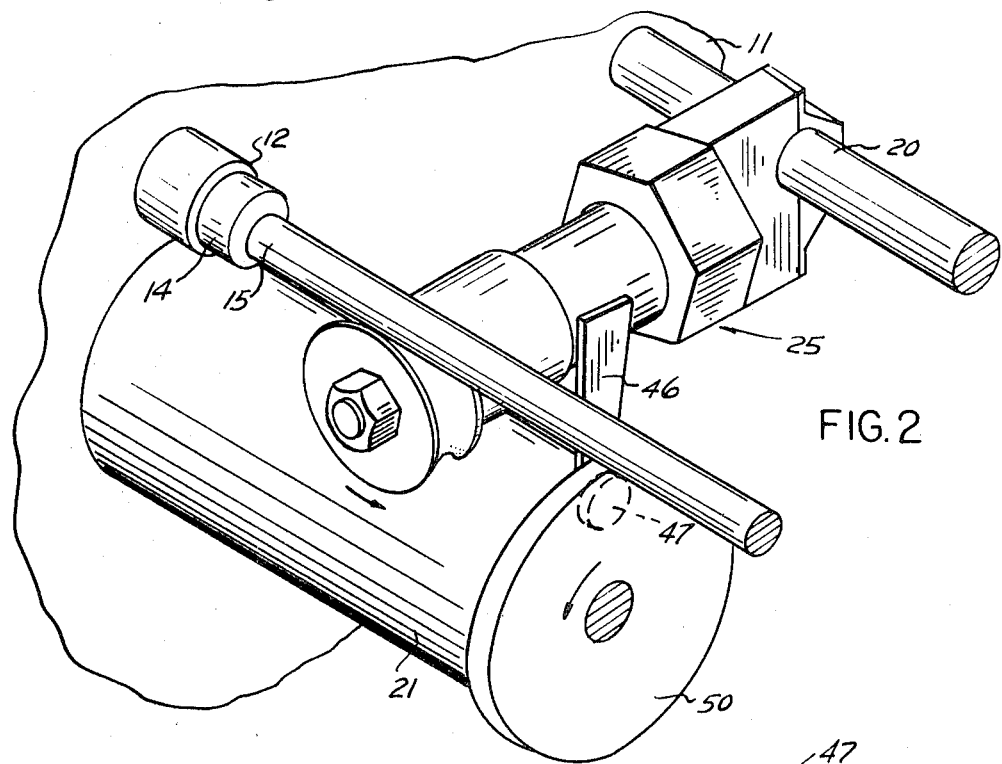
FIG. 2 is a perspective view of a portion of the machine illustrating the attachment herein mounted in operative, bar advancing position.
Figure 3:
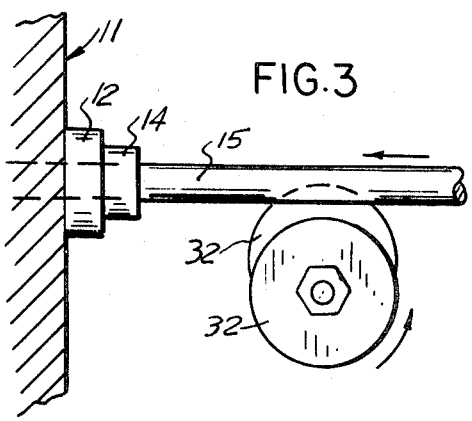
FIG. 3 is a schematic view showing the operation of the drive motor against the workpiece bar.
Figure 4:
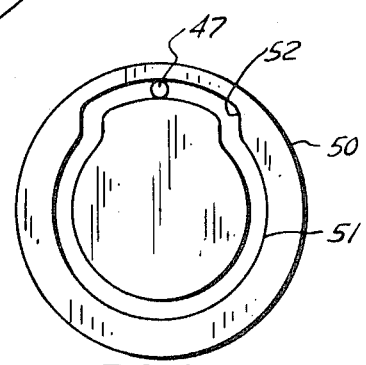
FIG. 4 is an inner face elevational view of the timing cam.

FIG. 1 schematically illustrates a portion of a conventional multiple spindle screw or bar machine generally designated as 10. The portions of such machine which are relevant to the invention herein are generally described as follows:

The machine includes a head stock 11 which contains a number of rotating, hollow, drive spindles 12 each containing a conventional locking collet or chuck 13 operated by a collet control shaft 14 for locking and unlocking against the workpiece bar or rod 15 which extends through the spindle.

Typically, the bar is initially of a considerable length such as in the order of 10 feet, and extends rearwardly to a tailstock 16 having suitable journal openings 17 for supporting the end of the bar.

A bracket 18 secured to the collet control shaft is moved forwardly and rearwardly by a drive or operator rod 19 which is controlled by mechanism within the headstock for locking and unlocking the collet 13 during the proper time wherein the bar is to be advanced.

The machine also includes a rearwardly extending machine shaft 20 and a rotatable operating drum 21.

The general operation of this type of machine involves moving the respective spindles, with their locked workpiece bars, through various work stations wherein tooling cuts and otherwise machines the ends of the bars. After completing the indexing cycle, the workpiece returns to the advancement position or loading and unloading position wherein the collet 13 is loosened by moving its control rod towards the right as shown in FIG. 1, and at that point moving the bar for advancement, also to the right, and then locking the collet again for again indexing the rod through the work stations.

All of the foregoing mechanism is conventional and does not form any part of this invention and thereby is described only generally and briefly for purposes of understanding the background and use of the invention herein.

The automatic feeder attachment 25 comprises an elongated, cylindrically shaped housing 26 within which a motor 27 is arranged. Preferably, a lightweight, constantly operating pneumatic motor may be used.

The motor drive shaft 28 extends outwardly of one end of the housing, which end is closed by a cup-shaped cap 29 which loosely overlaps the housing and is rotatably supported thereon by means of suitable bearings 30.

The cap is formed with an integral, hollow, stub shaft 31 which receives and is secured to the motor drive shaft 28 for rotation thereby.

Mounted upon the stub shaft 31 is the bar drive roller 32 formed of two roller halves 33–34 arranged face to face with the half 34 in contact with the base of the cap 29.

The roller is secured to the stub shaft 31 by means of a key 35 which permits roller 33 to slide axially of the shaft towards and away from roller half 34.

A peripheral bar receiving groove 36 is formed in the roller, with each half of the roller likewise carrying half of the groove formation.

The roller halves 33–34 are spring urged against the base of the cap 29 by means of a spring 37 preferably formed in the shape of an annular, truncated cone of springy metal. The compressive force of the spring may be adjusted by means of a nut 38 mounted upon the threaded end 39 of the shaft 31.

The opposite end of the housing 26 is provided with a closure cap 40 whose forward end is formed as a wrench grasping portion 41 (see FIG. 5) and whose rear end is formed as a journal plate 42 having an end portion or cover 43 suitably bored to provide a journal opening 44 of a size to rotatably receive the machine shaft 20 for mounting the attachment upon the spindle machine.

The cover 43 is secured to the journal plate 42 by means of cap screws 45 or the like so that the attachment may be mounted upon the machine shaft 20 and readily demounted therefrom as desired, for replacement and servicing.

A downwardly extending bracket 46 is secured to the housing and carries a cam follower roller 47 on a roller support shaft 48.

Mounted upon the machine operating drum 21 is a cam 50 having a face opening cam groove 51 with an offset cam portion 52, the groove being dimensioned to receive the cam follower roller 47.

The motor 27 may be powered by a compressed air source transmitting the compressed air through an air hose 53 connected to a fitting 54 extending through the housing and to the motor. Alternatively, a suitable electrically powered motor may be used in place of the pneumatic motor.

OPERATION

In operation, the attachment is rockingly mounted upon the machine shaft 20 by arranging the journal opening 44 around said shaft. Thus, the attachment may rock upwardly and downwardly in a plane transverse to the workpiece bar 15.

The motor 27 is continuously operated so that its shaft 28 rotates the cap 29 and the driver roller 32 mounted thereon.

The cam 50 is so timed that when the collet 13 is unlocked, that is when the workpiece is ready for advancement, the follower roller 47 is moved upwardly by the offset cam portion 52 to thereby rock the housing upwardly, placing the drive roller in peripheral contact with the bar. At that point, the outer roller half 33 may move axially, against the force of the spring 37, away from the inner roller 34 to better grasp the bar and provide a longitudinal or axially directed thrust for advancing the bar. When the collet 13 again locks the bar, the housing is rocked downwardly to end the contact between the roller and bar. The cycle is repeated for each of the bars carried by the spindle machine during the proper sequence of time.

Having fully described an operative embodiment of this invention, I now claim:

1. In a spindle bar machine having a hollow support spindle through which a workpiece bar is extended, with lock means for cyclically locking and unlocking the bar against longitudinal movement through the spindle, and including a machine shaft arranged parallel to but spaced from the bar and a rotating drum spaced from both the bar and the machine shaft, the improvement comprising:

an elongated housing having a journal formed on one end thereof, the journal being rotatably mounted upon said machine shaft for positioning the housing for rocking movement upon the shaft in a plane transverse to and towards and away from the bar;

a drive motor arranged within the housing and having a constantly rotating drive shaft extending outwardly of the opposite end of the housing;

a drive roller, arranged axially transverse to the bar, mounted upon and connected to the drive shaft for constant rotation therewith, the housing and drive shaft being of a length to bridge the space between the machine shaft and bar so that the roller peripherally contacts the bar, when the housing is rocked towards the bar, for exerting a longitudinally directed thrust thereon for moving the bar through the spindle;

a cam follower secured to the housing and interengaging with a cam secured upon and rotated by said rotating drum, the cam being formed to move the follower and thus rock the housing towards the bar when said lock means is unlocked and permit the housing to rock away from the bar when said lock means is locked.

2. A construction as defined in claim 1, and including a cup-shaped, rotatable cover fitted over and receiving said housing opposite end;

the base of the cover being formed with a centrally located hollow mounting shaft into which the motor drive shaft extends and is secured, so that the cover rotates with said drive shaft;

said roller being fitted upon and secured to said mounting shaft with one face of the roller arranged against the base of said cover.

3. A construction as defined in claim 2, and including support bearings operatively arranged between the wall defining said cover and the portion of the exterior wall of the housing received within said cover for rotatably supporting the cover upon the housing and for thereby transmitting transverse loads applied to the roller through the cover to the housing.

4. A construction as defined in claim 2, and said roller being formed as inner and outer roller halves with the inner half arranged against said cover base and the outer half being slidably mounted upon the mounting shaft for axially sliding towards and away from the inner half;

and a peripheral, bar receiving grove formed in the peripheral edge of the roller, with each of the adjacent peripheral edges of the roller halves formed into one half of the groove;

and an adjustable spring mounted upon the mounting shaft for spring resisting movement of the outer roller half away from the inner roller half when the bar is received within said groove.

5. A construction as defined in claim 4, and said spring means comprising an annular, truncated conically shaped spring surrounding said mounting shaft and having an annular edge engaging against the outer roller half and its opposite annular edge engaged against a nut axially adjustably mounted upon said mounting shaft for adjusting the spring compressive force.

6. A construction as defined in claim 1, and said cam follower comprising a roller and said cam comprising a disk having a continuous roller receiving groove formed in one face thereof, with a portion of the groove being spaced further from the disk axis than the remainder of the groove, for rocking the roller and thereby the housing towards and away from the bar.